April 2, 1963  K. MACLEOD ETAL  3,083,750
AUTOMATIC HOSE COUPLING MACHINE
Filed May 3, 1960  4 Sheets-Sheet 1

INVENTORS:
KEITH MACLEOD
EDWARD S. WENDT
BY Marzall, Johnston, Cook & Root
ATT'YS

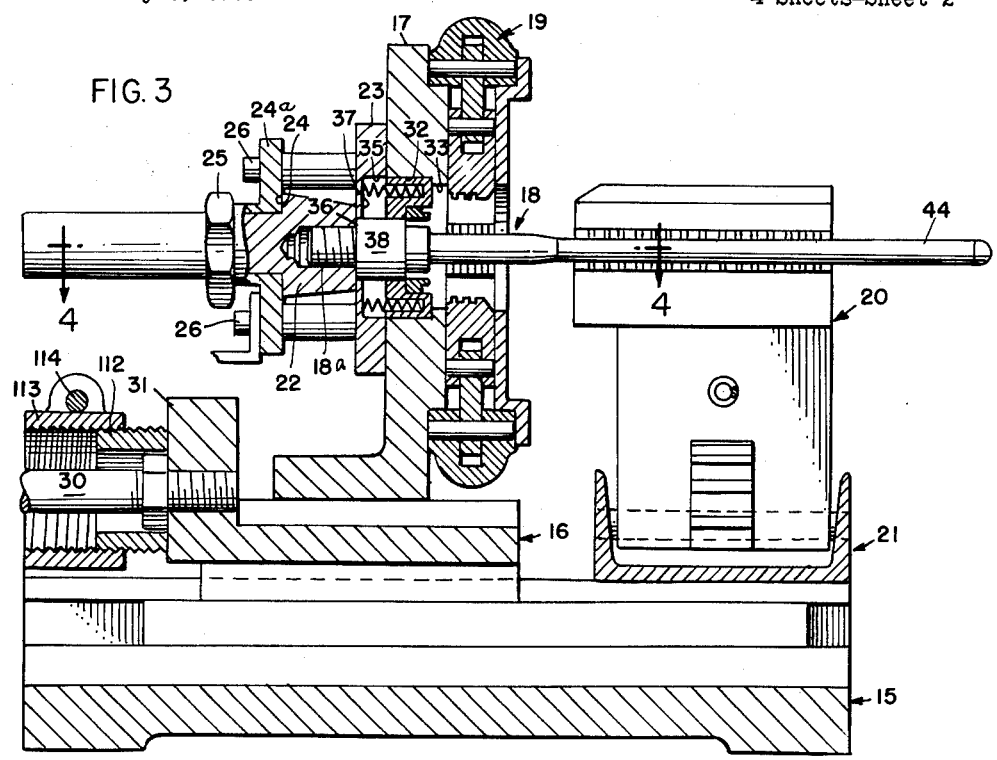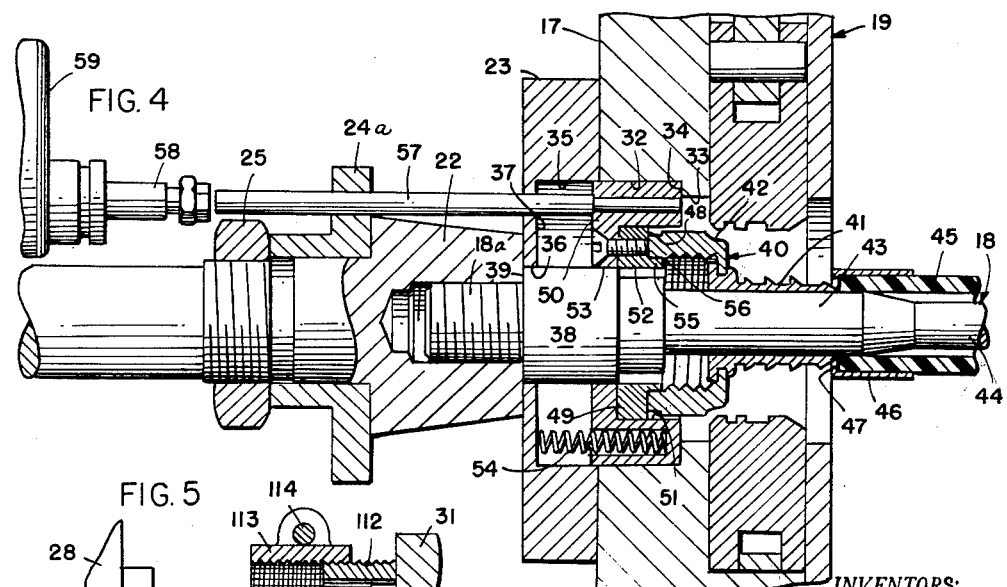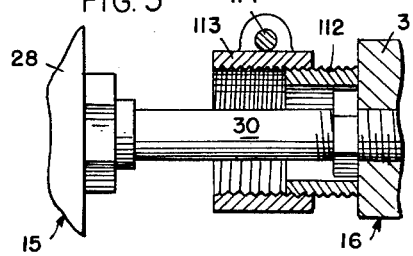

April 2, 1963     K. MACLEOD ETAL     3,083,750
AUTOMATIC HOSE COUPLING MACHINE
Filed May 3, 1960     4 Sheets-Sheet 3
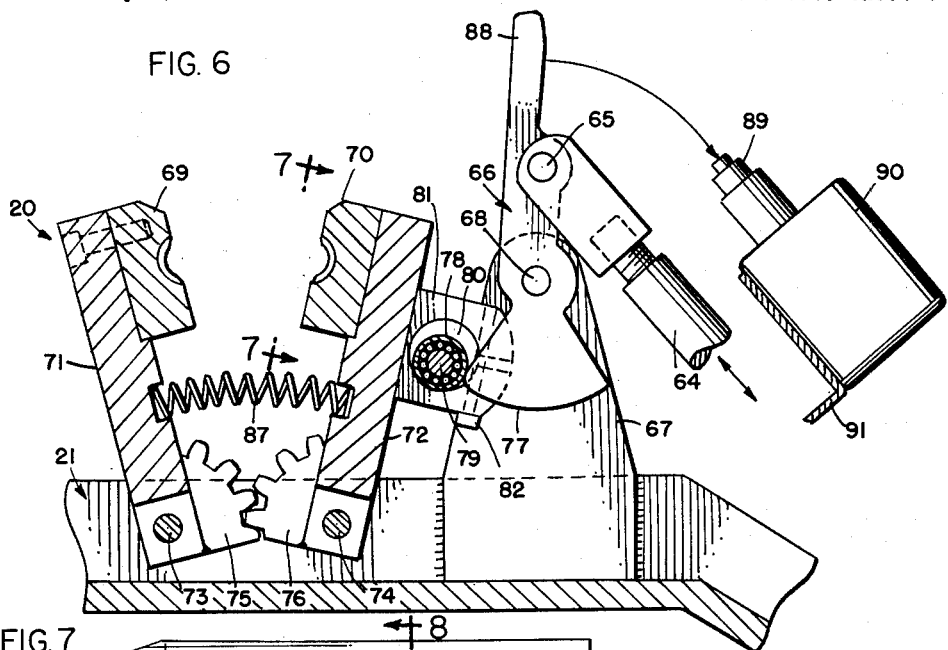
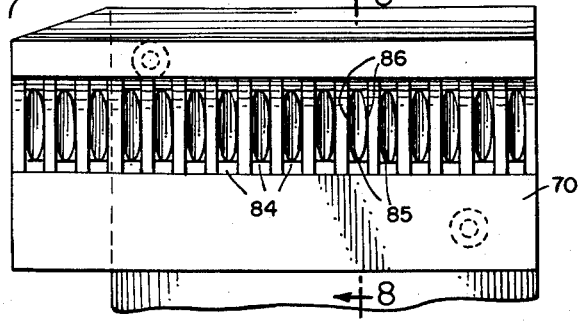
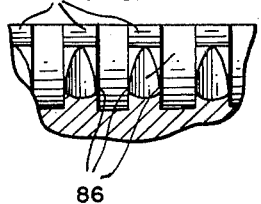
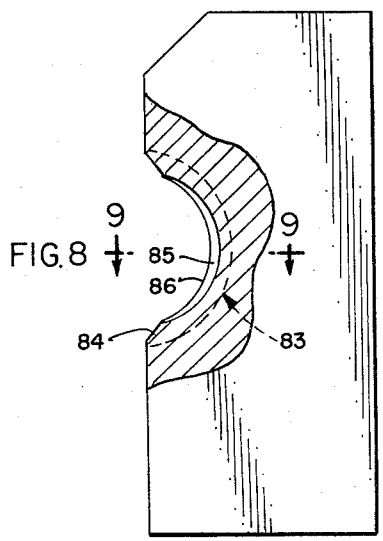
INVENTORS:
KEITH MACLEOD
EDWARD S. WENDT
BY *Marshall, Johnston, Cook & Root*
ATT'YS April 2, 1963 K. MACLEOD ETAL 3,083,750
AUTOMATIC HOSE COUPLING MACHINE
Filed May 3, 1960 4 Sheets-Sheet 4

INVENTORS:
KEITH MACLEOD
EDWARD S. WENDT
BY Mayall, Johnston, Cook+Root
ATT'YS

United States Patent Office 3,083,750
Patented Apr. 2, 1963

3,083,750
AUTOMATIC HOSE COUPLING MACHINE
Keith Macleod, Santa Barbara, Calif., and Edward S. Wendt, Chicago, Ill., assignors to W. D. Allen Manufacturing Co., Chicago, Ill., a corporation of Illinois
Filed May 3, 1960, Ser. No. 26,478
6 Claims. (Cl. 153—1)

This invention relates in general to the assembling of connectors or couplings and flexible hose, and more particularly to automatically operable apparatus for connecting couplings to plastic hose.

The present invention is an improvement of the copending Keith Macleod application, Serial No. 657,666, filed May 7, 1957, now Patent No. 2,986,192, entitled "Apparatus and Method for Connecting Couplings to Hose," also assigned to the assignee of this invention.

The machine of the present invention will automatically upon receiving a coupling and an end of a hose adjacent the coupling and having a ferrule positioned thereon, clamp the hose to the machine, insert the coupling into the end of the hose, and crimp the ferrule on to the end of the hose thereby permanently securing the coupling to the hose, and finally unclamp the hose allowing removal thereof from the machine. The machine of the present invention includes a base having a carriage slidably mounted thereon and supporting a mandrel which receives a coupling and hose thereon. A vise for clamping the hose to the base is secured to the base adjacent to the mandrel, while a crimper for crimping the ferrule on the hose is also carried on the carriage. Pneumatic cylinder means are provided for driving the carriage, the vise and the crimper, while electric switches are so mounted on the machine for sequentially and automatically operating the machine through a cycle to connect the coupling to the hose. A first switch member is arranged adjacent the mandrel and operable in response to engagement by the coupling as it is properly positioned on the mandrel for gripping the hose by the vise. A switch is mounted on the vise for advancing the carriage to insert the coupling into the end of the hose, and a switch mounted on the base is responsive to advancement of the carriage for operating the crimper through a cycle to crimp the ferrule on the hose. The crimper is provided with a first switch for returning the crimper to its starting position and a second switch for retracting the carriage to the original position. Finally, another switch on the base is provided for opening of the vise thereby to allow removal of the coupling and hose from the machine.

Accordingly, it is an object of this invention to provide an improved apparatus for automatically connecting couplings to flexible hose.

Another object of this invention resides in the provision of an automatically operable machine capable of connecting couplings to the ends of flexible garden hose, wherein the machine is extremely easy to operate and foolproof, and no skill is needed by the operator.

Still another object of this invention is in the provision of a compact automatic machine operable to connect couplings on the ends of flexible hoses which is simply and inexpensively constructed and operable upon proper positioning of a coupling and hose in the machine.

A further object of this invention is in the provision of an automatically operable hose coupling machine which will not operate if the coupling is positioned on the machine backwards.

A still further object of this invention is to provide an automatically operable hose coupling machine which may be easily adjusted for handling of various sizes of hoses and couplings.

Other objects, features and advantages of the invention will be apparent from the following detailed disclosure, taken in conjunction with the accompanying sheets of drawings, wherein like reference numerals refer to like parts, in which:

FIG. 3 is a longitudinal sectional view, taken along the elevation and substantially along line 3—3 of FIG. 2;

FIG. 4 is an enlarged detail sectional view taken substantially along line 4—4 of FIG. 3, and showing some parts in fragmentary;

FIG. 5 is an enlarged elevational view of a detail of the invention, and illustrating the components which are employed for varying the stroke of the carriage;

FIG. 6 is an enlarged detail view of the hose vise, some parts in section and other parts in fragmentary, and taken substantially along line 6—6 of FIG. 2;

FIG. 7 is a greatly enlarged view of one of the vise jaws as taken along line 7—7 of FIG. 6.

FIG. 8 is a greatly enlarged sectional view, taken substantially along line 8—8 of FIG. 8 of one of the vise jaws;

FIG. 9 is a greatly enlarged sectional view of a part of one of the vise jaws, and taken substantially along line 9—9 of FIG. 8;

Figure 1:
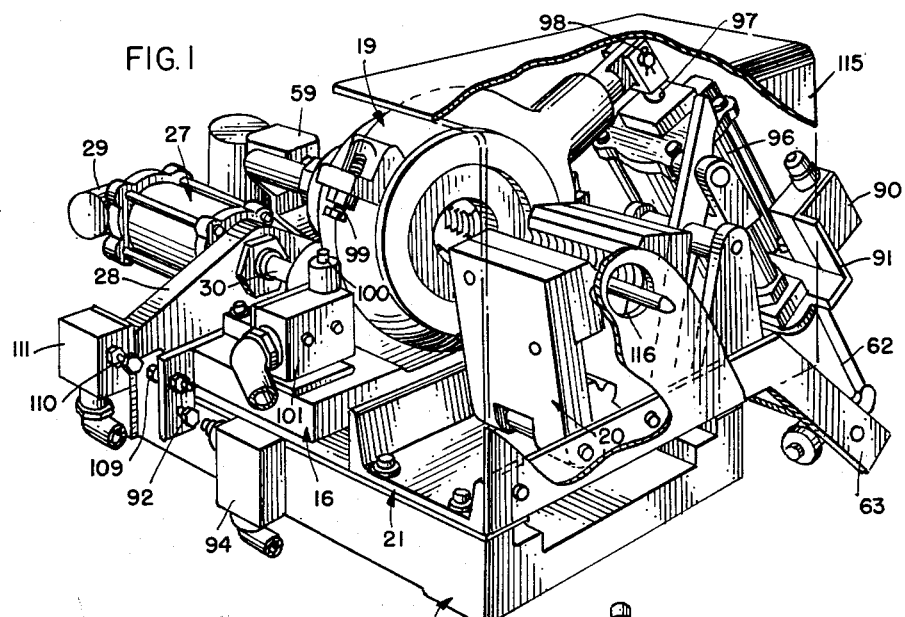
FIG. 1 is a perspective view of the hose coupling machine of the present invention, with some parts broken away to show underlying parts for purposes of clarity, and showing the movable parts in position for receiving a coupling and hose.

The present invention is especially useful in connecting couplings to flexible garden hose, where the coupling may be made of any material such as metal or plastic, and the garden hose may be made of plastic and rubber or other type of flexible material. It may be appreciated that the invention may have other uses and purposes known to those skilled in the art.

Referring now to the drawings, the coupling machine of the present invention includes a base generally designated by the numeral 15 and having a carriage generally designated by the numeral 16 slidably mounted thereon for movement along a rectilinear path in any suitable manner. An upstanding mounting plate 17 is secured to the carriage and serves to mount thereon a mandrel generally designated by the numeral 18 and a crimper generally designated by the numeral 19. A vise generally designated by the numeral 20 is secured to a channel member 21 extending transverse the base 15 and mounted rigidly thereon. Thus, the vise securely clamps the hose to the base, while the mandrel on the carriage advances toward the vise and inserts the coupling into the end of the hose in order to enable the crimper to crimp the ferrule on the end of the hose and secure the coupling thereto.

The mandrel 18 is provided with a threaded section 18a at its base that is screwed into a socket formed in an anchoring member 22, FIGS. 3 and 4. The anchoring member 22 abuts against a spacing plate 23 that, in turn, abuts against the mounting plate 17. An annular shoulder 24 is provided on the anchoring member 22 against which is secured a retaining flange 24a by means of a nut 25 suitably received on the anchoring member 22. The retaining flange 24 is secured to the mounting plate 17 by a pair of bolts 26, FIG. 3. Holes are provided in the spacing plate 23 for receiving the shanks of the bolts 26 and the spacing plate is held in place thereby and by the mounting plate 17.

Figure 13:
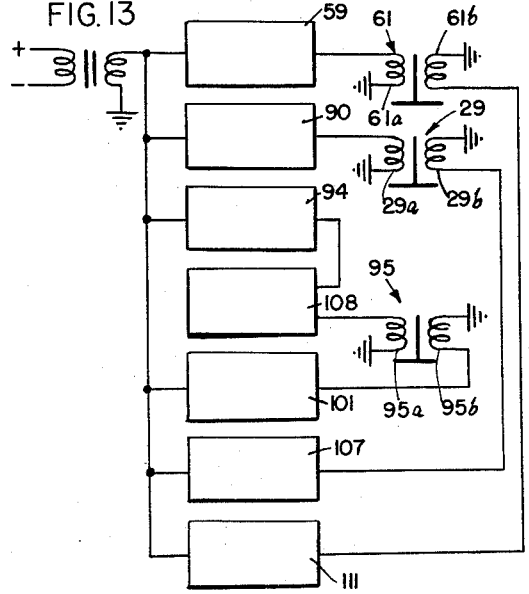
FIG. 13 is a diagrammatic electrical schematic diagram of the circuitry for operating the machine.

The carriage 16 is advanced toward and away from the vise 20 by means of a fluid cylinder 27, preferably pneumatic, which is mounted in horizontally extending position on an upstanding bracket 28 secured at one end of the base 15. The fluid cylinder is double acting and controlled by a double solenoid operated valve 29. The piston rod 30 of the cylinder 27 extends through the bracket 28 and is secured to an upstanding flange 31, FIG. 3, of the carriage 16. As seen in FIG. 13, the double solenoid operated valve 29 includes a solenoid coil 29a for advancing the piston rod and the carriage toward the vise 20, and a solenoid coil 29b for retracting the piston rod and carriage away from the vise 20. Thus, operation of the solenoid operated valve 29 controls the pneumatic cylinder 27 for controlling the movement of the carriage 16.

Referring again to FIGS. 3 and 4, the mounting flange 17 is provided with a pair of stepped bores 32 and 33 defining therebetween an annular shoulder 34 facing away from the crimper 19. The spacing plate 23 is provided with a pair of spaced bores 35 and 36 defining therebetween an annular shoulder 37 which faces the mounting plate 17 on the crimper 19. Thus, the bore 35 of the spacing plate 23 opens to the side of the spacing plate provided with the bore 32 and these bores are of identical size thereby defining a continuous bore having an adjoining cylindrical surface. The bore 36 in the spacing plate 23 is sized to receive the enlarged portion 38 of the mandrel 18 which defines a shoulder 39 in abutting relation with the anchoring member 22. Thus, the mandrel 18 bottoms on the anchoring member 22.

The mandrel 18 is formed for receiving either male or female couplings, a female coupling being illustrated on the mandrel in FIG. 4 and generally designated by the numeral 40. The female coupling includes a tail piece 41 and a swivel 42 and may be made of any desirable material. A corresponding male coupling (not shown) would also include a tail piece substantially like the tail piece on the female member and of the same size and an externally threaded end portion adapted to be received in the swivel of a female coupling. In order to give the tail piece 41 a solid backing during the crimping operation, the mandrel 18 includes a cylindrical portion 43 upwardly of the enlarged portion 38 and sized to meet with the internal diameter of the coupling tail pieces with just enough tolerance to permit sliding of the tail piece on and off thereof. Outwardly of the cylindrical tail piece backing portion 43 is provided an elongated somewhat reduced cylindrical section 44 that extends through the vise 20 as seen in FIG. 3 and properly guides the hose 45 into position for being engaged by the vise 20 and also to properly align the end of the hose for receiving the tail piece of a coupling upon insertion therein. After initially positioning the coupling on the outer end of the mandrel, and postioning of a ferrule 46 on the end of the hose, the hose may then be positioned on the mandrel whereby the very end engages the coupling and advances its along the mandrel into proper position. The ferrule 46 is provided with an annular flange 47 at one end which prevents relative movement thereof backward along the hose as the hose is positioned on the mandrel, and also permits the ferrule to be placed on the hose properly at all times. The ferrule will be of a suitable malleable metal such as brass or the like.

As the coupling 40 is positioned within the crimper, the leading end engages a radial surface 48 of a ring 49 that is suitably secured to a switch actuating ring 50 slidably mounted within the bores 32 and 35 of the mounting plate 17 and the spacing plate 23, respectively. If desired, the rings 49 and 50 may be consolidated into an integral single ring, but for illustration herein, a pair of rings are provided. As seen most clearly in FIG. 4, the ring 48 is received in a recess 51 of the switch actuating ring 50. Both rings 49 and 50 have identically sized and aligning axial bores 52 and 53 sized to be slidably received on the enlarged bore 38 of the mandrel 18. Thus, the rings 49 and 50 are essentially guided for movement axially of the mandrel by the mounting plate 17, the spacing plate 23 and the enlarged portion 38 of the mandrel. A plurality of blind holes are formed in the switch actuating ring 50 for receiving coil springs 54 that bottom therein and at the other end on the shoulder 37 of the spacing plate 23. Thus, the rings 49 and 50 are constantly resiliently urged toward the crimper 19, whereby the shoulder 34 on the mounting plate 17 defines a stop engaging the ring 50 at its outer peripheral edge.

Inasmuch as the machine of the present invention must accommodate male and female couplings which have differently formed ends, the ring 49 includes an axially projecting reduced cylindrical portion 55 which defines with a cylindrical wall of the recess 51 and the radial surface 48 an annular channel for receiving the swivel 42 of a female coupling. A radial face 56 is defined at the free end of the axially projecting reduced cylindrical portion 55, and which is so positioned as to engage or align with the free end of a male coupling as it is properly positioned on the tail piece receiving portion 43 of the mandrel. However, the diametrical dimension of the annular radial face 56 is greater than the diametrical dimension of the tail piece 41 of a coupling so that if a coupling is positioned improperly on the mandrel so that the tail piece leads the swivel, it will not be possible for the tail piece to actuate the ring 49 and the switch actuating ring 50.

The switch actuating ring 50 has a switch actuating rod 57 secured thereto in any suitable manner, such as by press fit, which is slidably guided in aligned apertures in the spacing plate 23 and the retaining flange 24, FIG. 4, so as to engage a switch actuating plunger 58 of a normally open impulse switch 59. The switch 59 is mounted on a bracket 60, FIG. 2, that is secured to the carriage 16 in any suitable manner. Thus, the switch 59 is mounted on the carriage 16 and movable therewith. By urging the hose 45 along the mandrel so that the end engages the tail piece of the coupling 40, the coupling 40 is, in turn, urged along the mandrel into engagement with the ring 49 to urge the ring 50 against the biasing of the spring 54 and toward the switch 59 thereby causing the rod 57 to operate the plunger 58 of the switch and operate the switch. When the coupling 40 has moved the rings 49 and 50 toward the switch 59, it will be appreciated that the swivel of the coupling will then be clear of the crimping dies in the crimper 19.

The impulse switch 59 is of the usual type which, when operated, momentarily closes a circuit to operate a double solenoid controlled valve 61, FIG. 13, and energizes a solenoid coil 61a to cause a double-acting fluid cylinder 62 to operate and close the vise 20. Closing of the vise 20 securely clamps the hose 45 in place and to the base 15 of the machine and thereby prevents longitudinal movement thereof during insertion of the coupling tail piece into the end of the hose.

The fluid cylinder 62 is preferably pneumatically operated, and is trunnion mounted to a downwardly extending bracket 63 that is carried at one end of the channel member 21 of the base 15. The cylinder 62 is provided with a piston rod 64 that is pivotally connected at 65 to a cam lever 66, FIG. 6. Upstanding arms 67 are secured to the channel member 21 and support a shaft 68 upon which is pivotally carried the cam lever 66.

As seen most clearly in FIG. 6, the vise 20 includes a pair of coacting hose clamping jaws 69 and 70 removably secured to upper ends of supporting arms 71 and 72, respectively. Parallel extending shafts 73 and 74 extend transversely the channel member 21 and are supported thereby for the purpose of pivotally mounting the supporting arms 71 and 72, respectively, to the channel member 21 on the base. Meshing segmental gears 75 and 76 are suitably secured to the supporting arms 71 and 72, respectively, thereby synchronizing the movement of the vise jaws and also to permit operation of both jaws where power is applied to one of the jaws.

A cam 77 is formed on the cam lever 66 and engages a cam roller 78 bearingly mounted on a shaft 79. The shaft 79 is secured at opposite ends to eccentrics 80 which, in turn, are adjustably secured in aligned bores formed in split bosses 81 fastened on the supporting arm 72. Bolts 82 are provided in the split bosses 81 for locking and unlocking the eccentrics 80 thereto, whereby rotation of eccentrics and the shaft 79 adjustably position the cam roller 78 closer to or further away from the cam 77 and thereby adjust the closed positions of the jaws 69 and 70 for purposes of handling various diameters of hose.

As already explained, the vise jaws 69 and 70 are removable thereby permitting various sizes of jaws to be mounted on the support arms 71 and 72 for accommodating various sizes of hose. Each vise jaw includes an elongated half-moon shaped trough 83, FIG. 8, having a plurality of longitudinally spaced ribs or projections 84 functioning as gripping members. Each rib 84 is provided with a concavity of varying depth from one end to the other end and defined generally by the numeral 85 for defining quite sharp ridges or edges 86 that engage the walls of the hose and prevent it from sliding longitudinally within the trough 83 of the vise jaws.

While closing of the vise 20 is accomplished by the double-acting fluid cylinder 62, the vise is opened by means of one or more coil springs 87 arranged between the supporting arms 71 and 72, FIG. 6, which continually urges the cam roller 78 against the cam 77 upon retraction of the piston rod 64 of the cylinder.

Figure 2:
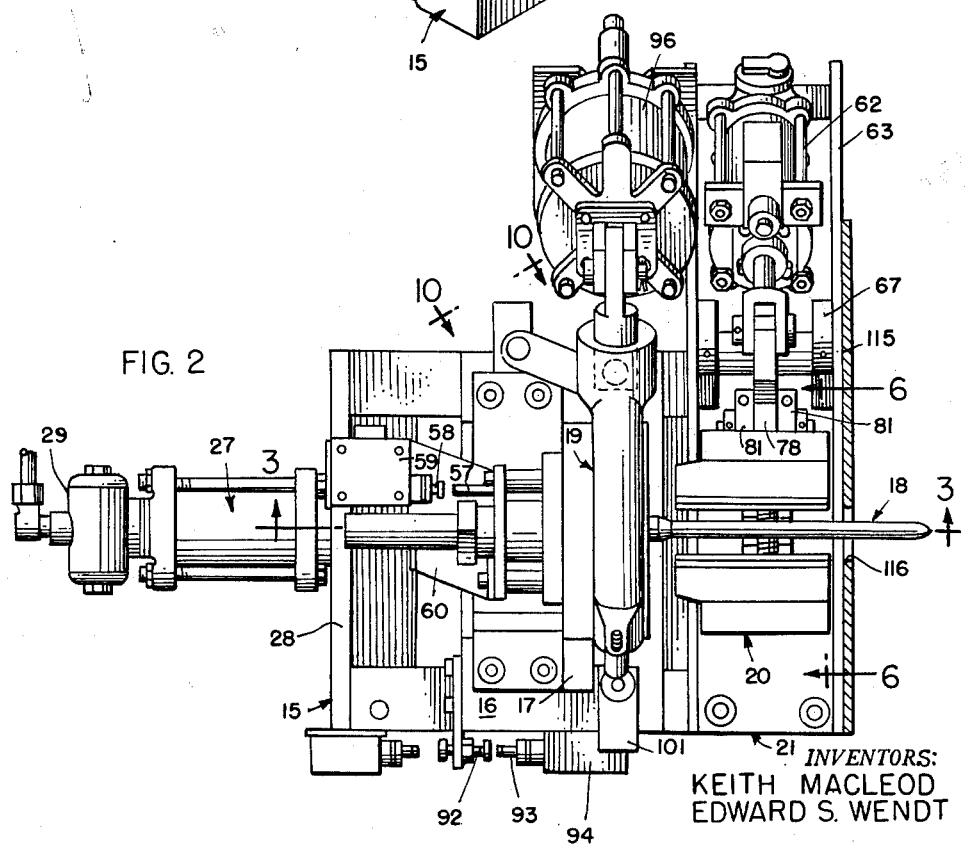
FIG. 2 is a top plan view of the machine in FIG. 1.
Figure 10:
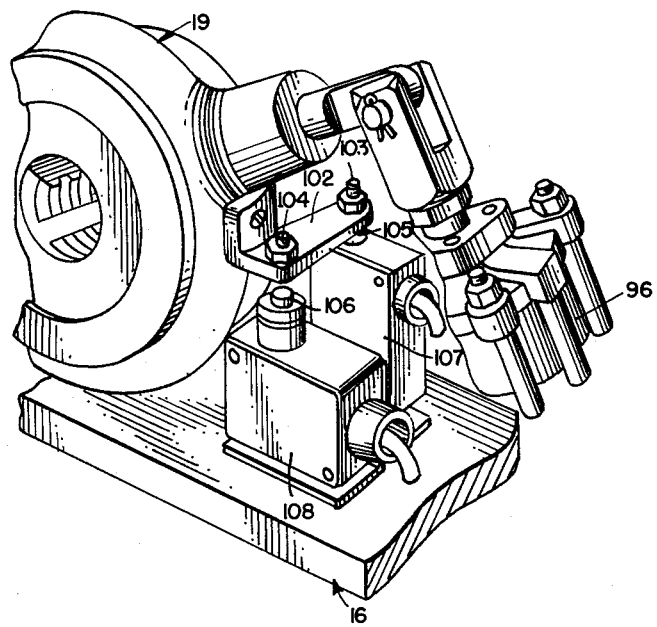
FIG. 10 is a perspective view looking in from the back of the machine as indicated by line 10—10 of FIG. 2.
Figure 11:
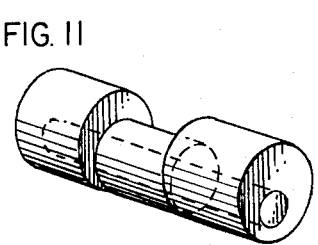
FIG. 11 is a detail of the eccentric adjusting components of the hose vise, illustrating the eccentrics and the cam roller therebetween.
Figure 12:
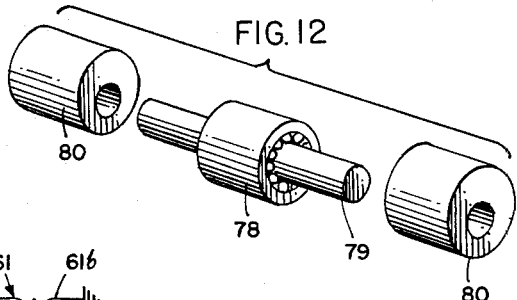
FIG. 12 is an exploded view of the detail of FIG. 11.

As the vise 20 is closed, the cam lever 66 having a lug 88 thereon engages a plunger 89 of a normally open impulse switch 90 mounted on a bracket 91 carried on the fluid cylinder 62. The actuation of the impulse switch 90 momentarily energizes the solenoid coil 29a in the valve 29 to cause operation of the carriage fluid cylinder 27 for advancing the carriage toward the vise and inserting the tail piece of the coupling into the end of the hose held by the vise. Upon full insertion of the tail piece into the end of the hose, an adjustable lug 92, FIGS. 1 and 2, which is mounted on the carriage 16, engages a plunger 93 of the normally open microswitch 94 to energize a solenoid coil 95a, FIG. 13, of a double solenoid operated valve 95 for controlling a double-acting fluid cylinder 96 which drives the crimper 19. The cylinder 96 is trunnion mounted on the carriage 16 and includes a piston rod 97 pivotally connected to the crimper by pin 98. Thus, protraction of the piston rod 97 operates the crimper 19 to crimp the ferrule on the hose and secure the hose to the tail piece of the coupling. Actually, the crimping dies of the crimper are shifted inwardly to crimp the ferrule and then outwardly again during rotation of the crimper by protraction of the piston rod 97. More detailed operation of the crimper may be found in the above-identified copending application. When the crimper has passed through a cycle of crimping operation, a lug 99 on the crimper engages a plunger 100 of a normally open microswitch 101 mounted on the carriage, FIGS. 1 and 2, which energizes the solenoid coil 95b of the crimper valve 95 to return the crimper to its normal position as seen in FIGS. 1, 2 and 10. Thus, the outer crimper housing oscillates on the carriage to operate the crimping dies.

A laterally extending arm 102 is secured to the crimper housing, FIG. 10, and has mounted thereon adjustable lugs 103 and 104 which respectively engage plungers 105 and 106 of a normally open impulse switch 107 and a normally open microswitch 108, respectively. The lug 103 is positioned on the arm 102 to actuate the switch 107 ahead of actuating the switch 108, whereby the switch 107 momentarily energizes the solenoid coil 29b of the valve 29 to retract the carriage or move it away from the vise. The switch 108 serves as an interlock to prevent current from being constantly impressed on the solenoid coil 95 during the time the switch 94 is closed when the carriage is in advanced position.

When the carriage returns to its normal position away from the vise, a lug 109 mounted on the carriage engages a plunger 110 of a normally open impulse switch 111 to momentarily energize the solenoid coil 61b of the valve 61 and operate the fluid cylinder 62 to open the vise 20 and release the hose therefrom. The hose with the coupling connected thereon can then be removed from the machine.

In order to adjust the machine for handling of various lengths of couplings, it is necessary to adjust the stroke of the carriage, and inasmuch as the fluid cylinder 27 is preferably pneumatic, this can be done by restricting the return movement of the piston rod 30. As seen particularly in FIG. 5, an externally threaded sleeve 112 is secured to the carriage and in encircling relationship with the piston rod 30. A split collar 113 which is internally threaded is received on the sleeve which will engage the bracket 28 and restrict the return movement of the carriage depending upon the relative position of the collar on the sleeve. A bolt 114 may be provided which may be loosened or tightened to unlock or lock the split collar on the sleeve. Thus, by moving the collar along the sleeve the stroke of the piston rod 30 and the carriage can be adjusted to handle various sizes of couplings.

The machine of the present invention is flexible in that it may be used for various sizes of hose and couplings. To set up the machine for another hose diameter which would require a different size coupling, it is merely necessary to change the mandrel, the vise jaws and crimping dies, adjust the eccentric mounted cam collar 78, and change the length of the carriage stroke if the coupling length differs. Further, adjustment may be made of the various lugs which actuate the plungers of the switches in order to obtain proper operation of the machine.

In operation of the machine, a coupling will be properly positioned on the mandrel with the tail piece going on last, and the coupling will be advanced along the mandrel by placing a hose thereon which pushes the coupling toward the switch actuating rings 49 and 50. Of course, a ferrule will be properly positioned on the end of the hose prior to its being placed on the mandrel. Then as the hose is continued to be pushed on the mandrel and the coupling engages the switch actuating rings 49 and 50, to actuate the impulse switch 59 and initiate the automatic operation of the machine, the tail piece of the coupling will be properly positioned relative to the crimper 19. Actuation of the switch 59 closes the vise 20 to firmly hold the hose in position. Closing of the vise 20 operates the switch 90 which controls the advancing of the carriage toward the vise to insert the coupling tail piece into the end of the hose. When the tail piece has been properly inserted in the end of the hose, the carriage actuates the switch 94 for operating the crimper to crimp the ferrule on the hose. When the crimper has rotated through a crimping operation, it actuates the switch 101 to return the crimper to its original position at which time the crimper actuates the switch 107 to return the carriage to its original position away from the vise. It will be appreciated that when the carriage has been returned, the tail piece receiving portion 43 of the mandrel will be substantially removed from the tail piece in order to relieve any possible pressure thereon which would otherwise make it difficult to remove the hose from the machine. And as the carriage returns to its original position it operates the switch 111 which opens the vise 20 and permits removal of the hose and coupling therefrom.

In order to prevent accidents and to protect the operator from injuring his hands in the vise jaws or other movable parts, a protective shield 115, FIGS. 1 and 2, is mounted on the base over the movable parts and is provided with an aperture 116 through which the end of the mandrel 18 extends. Thus, it is difficult, if not impossible, to accidentally become entangled with the various levers and moving parts of the machine.

From the foregoing, it will be appreciated that any person, skilled or otherwise, can with ease operate the machine of the invention to connect couplings to hose. The various operations of the machine take only a few seconds to complete whereby a great amount of quality production can be obtained from the machine.

It will be understood that modifications and variations may be effected without departing from the scope of the novel concepts of the present invention, but it is understood that this application is to be limited only by the scope of the appended claims.

The invention is hereby claimed as follows:

1. An automatic hose coupling machine for connecting couplings to hose comprising a base, a carriage reciprocably mounted on said base, a mandrel mounted on said carriage and adapted to receive a hose coupling having a tail piece and hose with ferrule, a vise mounted on said base, a crimper on said carriage adapted to crimp the ferrule on the hose, drive means for closing and opening said vise to selectively anchor the hose to said base, drive means for advancing and retracting said carriage relative said vise to selectively insert the coupling in the end of the hose, drive means for closing and opening the crimper to selectively crimp the ferrule on the hose and in alignment with the tail piece and secure the coupling to the hose, means responsive to predetermined positioning of said coupling on said mandrel so that the tail piece aligns with said crimper to close said vise, means operable on closing of said vise to advance the carriage and mandrel and insert the coupling in the hose, means operable by advancing of said carriage to close said crimper, means operable upon closing said crimper to open said crimper, and means operable upon closing said crimper to retract the carriage.

2. An automatic hose coupling machine for connecting couplings to hose comprising a base, a carriage reciprocably mounted on said base, a mandrel mounted on said carriage and adapted to receive a hose coupling having a tail piece and hose with ferrule, a vise mounted on said base, a crimper on said carriage adapted to crimp the ferrule on the hose and in alignment with the tail piece, drive means for closing and opening said vise to selectively anchor the hose to said base, drive means for advancing and retracting said carriage relative said vise to selectively insert the coupling in the end of the hose, drive means for closing and opening the crimper to selectively crimp the ferrule on the hose and secure the coupling to the hose, means responsive to predetermined positioning of said coupling on said mandrel so that the tail piece aligns with said crimper to actuate said carriage drive means and advance the carriage and mandrel to insert the coupling in the end of the hose, means responsive to advancement of said carriage to actuate crimper drive means to close said crimper and crimp the ferrule on the hose and coupling, means responsive to closing of said crimper to actuate said crimper drive means and open said crimper, means responsive to opening of said crimper to actuate said carriage drive means for retracting said carriage and mandrel, and means responsive to retraction of said mandrel to actuate said vise drive means to open said vise.

3. An automatic hose coupling machine for connecting couplings to hose comprising a base, a carriage reciprocably mounted on said base, a mandrel mounted on said carriage and adapted to receive a hose coupling and hose with ferrule, a vise mounted on said base, a crimper on said carriage adapted to crimp the ferrule on the hose, drive means for closing and opening said vise to selectively anchor the hose to said base, drive means for advancing and retracting said carriage relative said vise to selectively insert the coupling in the end of the hose, drive means for closing and opening the crimper to selectively crimp the ferrule on the hose and secure the coupling to the hose, and a movable ring surrounding the base of said mandrel engageable and responsive to pressure imparted thereagainst by said coupling for actuating said vise drive means to sequentially and automatically operate all of said drive means to secure the coupling to the hose.

4. An automatic hose coupling machine for connecting couplings to hose comprising a base, a carriage reciprocably mounted on said base, a mandrel mounted on said carriage and adapted to receive a hose coupling and hose with ferrule, a vise mounted on said base, a crimper on said carriage adapted to crimp the ferrule on the hose, drive means for closing and opening said vise to selectively anchor the hose to said base, drive means for advancing and retracting said carriage relative said vise to selectively insert the coupling in the end of the hose, drive means for closing and opening the crimper to selectively crimp the ferrule on the hose and secure the coupling to the hose, and a spring biased ring surrounding the base of said mandrel responsive and movable by pressure imparted thereagainst by said coupling for actuating said vise drive means to sequentially and automatically operate all of said drive means to secure the coupling to the hose.

5. An automatic hose coupling machine for connecting couplings to hose comprising a base, a vise secured to said base and adapted to grip hose, a carriage mounted on said base for slidable movement toward and away from said vise, a mandrel mounted on said carriage and adapted to receive a hose coupling and hose with ferrule, a crimper carried on said carriage and adapted to crimp the ferrule on the hose, drive means for opening and closing said vise to selectively anchor the hose to said base, drive means for moving said carriage toward and away from said vise for selectively inserting the coupling in the end of the hose, drive means for opening and closing said crimper to selectively crimp the ferrule on the hose and secure the coupling thereto, means mounted on said carriage responsive to pressure engagement thereagainst by said coupling to actuate said vise drive means and close said vise to grip the hose, means mounted on said vise responsive to closing thereof for actuating said carriage drive means to move the carriage toward said vise and insert the coupling in the end of the hose, means on said base engageable by movement of said carriage toward said vise to actuate said crimper drive means and close said crimper to crimp the ferrule on the hose and secure the hose to the coupling, means on said base engageable by said crimper in closed position to actuate said crimper drive means and open said crimper, means on said base engageable by said crimper in open position to actuate said carriage drive means and move said carriage away from said vise, and means on said base engageable by movement of said carriage away from said vise for actuating said vise drive means to open said vise.

6. An automatic hose coupling machine for connecting couplings to hose comprising a base, a vise secured to said base and adapted to grip hose, a carriage mounted on said base for slidable movement toward and away from said vise, a mandrel mounted on said carriage and adapted to receive a hose coupling and hose with ferrule, a crimper carried on said carriage and adapted to crimp the ferrule on the hose, drive means for opening and closing said vise to selectively anchor the hose to said base, drive means for moving said carriage toward and away from said vise for selectively inserting the coupling in the end of the hose, drive means for opening and closing said crimper to selectively crimp the ferrule on the hose and secure the coupling thereto, and electric circuit means energized by pressure responsive means that is adapted to be engaged and actuated by said coupling on said mandrel for sequentially and automatically cycling said machine to connect said coupling to said hose, said electric circuit means including switches actuatable by operation of said vise, carriage and crimper for actuating said drive means.

References Cited in the file of this patent

UNITED STATES PATENTS

| | | |
|---|---|---|
| 2,371,358 | Sekella | Mar. 13, 1945 |
| 2,377,829 | Vaill | June 5, 1945 |
| 2,486,830 | Farrar et al. | Nov. 1, 1949 |